United States Patent
Vijayanarasimhan et al.

(10) Patent No.: US 10,049,305 B2
(45) Date of Patent: Aug. 14, 2018

(54) LARGE-SCALE CLASSIFICATION IN NEURAL NETWORKS USING HASHING

(71) Applicant: Google LLC, Mountain View, CA (US)

(72) Inventors: Sudheendra Vijayanarasimhan, Mountain View, CA (US); Jay Yagnik, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/656,192

(22) Filed: Jul. 21, 2017

(65) Prior Publication Data

US 2017/0323183 A1 Nov. 9, 2017

Related U.S. Application Data

(63) Continuation of application No. 14/933,256, filed on Nov. 5, 2015, now Pat. No. 9,721,190.

(60) Provisional application No. 62/094,768, filed on Dec. 19, 2014.

(51) Int. Cl.
*G06K 9/62* (2006.01)
*G06K 9/66* (2006.01)
*G06N 3/04* (2006.01)
*G06N 3/08* (2006.01)

(52) U.S. Cl.
CPC .............. *G06K 9/6267* (2013.01); *G06K 9/66* (2013.01); *G06N 3/04* (2013.01); *G06N 3/082* (2013.01)

(58) Field of Classification Search
CPC ........ G06N 7/023; G06N 99/005; G06N 3/04; G06N 3/0409; G06N 3/0418; G06N 3/0427; G06N 3/0436; G06N 3/0445; G06N 3/0454; G06N 3/0463; G06N 3/0472; G06N 3/0481; G06N 3/049; G06N 3/06; G06T 2207/20081; G05B 2219/33018; G05B 2219/39311; G06K 9/6217; G06K 9/6256
See application file for complete search history.

(56) References Cited

U.S. PATENT DOCUMENTS 8,065,248 B1 * 11/2011 Baluja ...................... G06N 3/08
706/25
9,721,190 B2 * 8/2017 Vijayanarasimhan . G06N 3/082

OTHER PUBLICATIONS

Ba et al. "Adaptive dropout for training deep neural networks," Advances in Neural Information Processing Systems, 2013, 9 pages.

(Continued)

*Primary Examiner* — Duy M Dang
(74) *Attorney, Agent, or Firm* — Fish & Richardson P.C.

(57) ABSTRACT

Methods, systems, and apparatus, including computer programs encoded on computer storage media, for classification using a neural network. One of the methods for processing an input through each of multiple layers of a neural network to generate an output, wherein each of the multiple layers of the neural network includes a respective multiple nodes includes for a particular layer of the multiple layers: receiving, by a classification system, an activation vector as input for the particular layer, selecting one or more nodes in the particular layer using the activation vector and a hash table that maps numeric values to nodes in the particular layer, and processing the activation vector using the selected nodes to generate an output for the particular layer.

18 Claims, 3 Drawing Sheets

(56) References Cited

OTHER PUBLICATIONS

Bakhtiary et al. "Speeding up Neural Networks for Large Scale Classification using WTA Hashing," arXiv preprint arXiv1504.07488v1 Apr. 28, 2015, 9 pages.
Baluja and Covell, "Learning "Forgiving" Hash Functions: Algorithms and Large Scale Tests," IJCAI'07 Proceedings of the 20th international joint conference on Artificial intelligence, pp. 2663-2669, 2007.
Davis et al. "Low-rank Approximations for Conditional Feedforward Computation in Deep Neural Networks," arXiv preprint arXiv1312.4461v4 Jan. 28, 2014, 10 pages.
Dean et al., "Fast, Accurate Detection of 100,000 Object Classes on a Single Machine," 2013 IEEE Conference on Computer Vision and Pattern Recognition, pp. 1814-1821, 2013.
Dean et al., "Large Scale Distributed Deep Networks," Advances in Neural Information Processing Systems 25, pp. 1232-1240, 2012.
Extended European Search Report issued in European Application No. 15196866.6-1879, dated Feb. 16, 2017, 14 pages.
Gionis et al., "Similarity Search in High Dimensions via Hashing," Proceedings of the $25^{th}$ International Conference on Very Large Data Bases, pp. 518-529, 1999.
Jaderberg, "Fast, Accurate Detection of 100k Object Classes on a Single Machine," Dean et al., University of Oxford, PowerPoint Presentation, Jun. 24, 2013, 35 pages.
Karpathy et al., "Large-scale Video Classification with Convolutional Neural Networks," CVPR '14 Proceedings of the 2014 IEEE Conference on Computer Vision and Pattern Recognition, pp. 1725-1732, 2014.
Krizhevsky et al., "ImageNet Classification with Deep Convolutional Neural Networks," Advances in Neural Information Processing Systems 25 (NIPS 2012), pp. 1097-1105.
Le and Mikolov, "Distributed Representations of Sentences and Documents," Proceedings of the $31^{st}$ International Conference on Machine Learning, 9 pages, 2014.
Le et al., "Building High-level Features Using Large Scale Unsupervised Learning," Proceedings of the $29^{th}$ International Conference on Machine Learning, 11 pages, 2012.
Lian et al., "One-way Hash Function Based on Neural Network," arXiv:0707.4032v1 [cs.CR], pp. 1-7, Jul. 2007.
Masci et al., "Sparse similarity-preserving hashing," arXiv:1312.5479v3 [cs.CV], 13 pages, Feb. 2014.
Mikolov et al., "Distributed Representations of Words and Phrases and their Compositionality," Advances in Neural Information Processing Systems 26, pp. 3111-3119, Oct. 2013.
Morin and Bengio, "Hierarchical Probabilistic Neural Network Language Model," Proceedings of the international workshop on artificial intelligence and statistics, pp. 246-252, 2005.
Norouzi et al., "Hamming Distance Metric Learning," Neural Information Processing Systems (NIPS), pp. 1-9, 2012.
Shang et al., "Real-time Large Scale Near-duplicate Web Video Retrieval," MM' 10 Proceedings of the international conference on Multimedia, Oct. 2010, pp. 531-540.
Song et al., "Multiple Feature Hashing for Real-time Large Scale Near-duplicate Video Retrieval," MM' 11 Proceedings of the $19^{th}$ ACM international conference on Multimedia, Nov.-Dec. 2011, pp. 423-432.
Strecha et al., "LDAHash: Improved matching with smaller descriptors," IEEE Transactions on Pattern Analysis and Machine Intelligence, 34(1):66-78, May 2011.
Torralba et al., "Small Codes and Large Image Databases for Recognition," IEEE Conference on Computer Vision and Pattern Recognition, 2008. CVPR 2008, pp. 1-8, Jun. 2008.
Vijayanarasimhan et al. "Deep Networks with Large Output Spaces," arXiv preprint arXiv 1412.7479v4, Apr. 10, 2015, 9 pages.
Weston et al., "WSABIE: Scaling Up to Large Vocabulary Image Annotation," Proceedings of the International Joint Conference on Artificial Intelligence, IJCAI, 7 pages, 2011.
Wu et al., "Neural Networks for Molecular Sequence Classification," Math. Comput. Simul. 40, 23-33, 1993.
Xia et al., "Supervised Hashing for Image Retrieval via Image Representation Learning," Proceedings of the $28^{th}$ AAAI Conference on Artificial Intelligence, pp. 2156-2162, Jun. 2014.
Yagnik et al., "The Power of Comparative Reasoning," Proc. IEEE International Conference on Computer Vision. pp. 2431-2438, 2011.
Yang and Chen, "A Dynamic K—Winners-Take-All Neural Network," IEEE Transactions on Systems, Man, and Cybernetics—Part B: Cybernetics, 27(3):523-526, Jun. 1997.
Zhao et al., "Near-Duplicate Keyframe Identification With Interest Point Matching and Pattern Learning," IEEE Transactions on Multimedia, 9(5):1037-1048, Aug. 2007.

* cited by examiner

LARGE-SCALE CLASSIFICATION IN NEURAL NETWORKS USING HASHING

CROSS-REFERENCE TO RELATED APPLICATIONS

This application is a continuation of U.S. application Ser. No. 14/933,256, filed Nov. 5, 2015, which claims the benefit of U.S. Provisional Application No. 62/094,768, filed on Dec. 19, 2014, the contents of each are incorporated herein by reference.

BACKGROUND

This specification relates to image recognition using neural networks.

Deep neural networks with several levels and hierarchies of features may have very large learning capacity and be used in speech or image recognition. Deep neural networks typically have several layers of units connected in a feed-forward fashion between the input and output spaces. Each layer in a deep neural network may perform a specific function, e.g., convolution, pooling, normalization, or matrix multiplication and non-linear activation.

SUMMARY

In some implementations, a system uses matrix multiplication to determine an output for a particular layer in a neural network. For instance, the matrix multiplication is a combination of an activation vector, e.g., input for the particular layer, and a weight matrix, e.g., the weights for some of the nodes in the particular layer. The neural network uses a fast locality-sensitive hashing technique to approximate a result of the matrix multiplication to allow the neural network to generate scores for a large number, e.g., millions, of output classes.

When a neural network uses a hashing technique, the neural network may approximate computation of a matrix product of weights W for a particular layer in the neural network and an activation vector x so that the number nodes in the particular layer, e.g., output dimensions, can be increased by several orders of magnitude. In some examples, the particular layer may be an output layer in a neural network, e.g., a final classification layer, which is used to determine a classification of an input to the neural network.

In general, one innovative aspect of the subject matter described in this specification can be embodied in methods for processing an input through each of multiple layers of a neural network to generate an output, wherein each of the multiple layers of the neural network includes respective multiple nodes include the actions of for a particular layer of the multiple layers: receiving, by a classification system, an activation vector as input for the particular layer, selecting one or more nodes in the particular layer using the activation vector and a hash table that maps numeric values to nodes in the particular layer, and processing the activation vector using the selected nodes to generate an output for the particular layer. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

The foregoing and other embodiments can each optionally include one or more of the following features, alone or in combination. The method may include creating a modified activation vector by setting the values in the activation vector that correspond to the nodes that were not selected to zero. Processing the activation vector using the selected nodes to generate the output for the particular layer may include processing the modified activation vector to generate the output for the particular layer. The hash table stores, for each of the nodes of the particular layer, a respective hash of weight values of the node. Selecting the one or more nodes may include computing a hash code for at least a portion of the activation vector, determining one or more most similar hashes in the hash table to the hash code of the portion of the activation vector, and selecting the nodes corresponding to the one or more most similar hashes. The hash table stores, for each of the nodes of the particular layer, a respective node identifier of the node.

In some implementations, the activation vector includes real number values. The method may include converting each of the real numbers in the activation vector to binary values to create a binary vector, determining multiple portions of the binary vector, and converting, for each of the portions, the binary values in the respective portion into an integer. Selecting the nodes in the particular layer using the activation vector and the hash table may include selecting the one or more nodes in the particular layer by using the integers as input to the hash table. The integers may include a first subset and a second, mutually exclusive subset. Selecting the one or more nodes in the particular layer by using the integers as input to the hash table may include determining, for each of the integers in the first subset, that the hash table does not include a corresponding first entry for a node, determining, for each of the integers in the second subset, that the hash table includes a corresponding second entry for a node, and selecting the one or more nodes in the particular layer as the nodes identified by the second entries. Determining, for each of the integers in the first subset, that the hash table does not include a corresponding first entry for a node may include determining, for at least some of the integers in the first subset, that the hash table does not include a corresponding first entry with a current time stamp. The method may include determining, for at least some output values in the output, an accuracy value of a respective output value, and updating at least some of the mappings in the hash table using the accuracy values by updating time stamps for a first node entry in the hash table for a particular node in the particular layer and not updating time stamps for a second node entry in the hash table that does not correspond to any nodes in the particular layer. The method may include determining, by the classification system, old entries in the hash table that have an old timestamp, and removing the old entries from the hash table.

In some implementations, the particular layer may include an output layer of the neural network. The method may include determining a best output value from the output for the particular layer, and using the best output value as output for the neural network. The classification system may be an image classification system. Each of the nodes in the output layer may correspond to a respective object class. The method may include receiving an image, and using the image as input to the neural network. Using the best output value as output for the neural network may include classifying an object in the image as belonging to the class corresponding to the node that generated the best output value. Receiving the image may include receiving, from a device, data identifying the image, and using the image as input to the neural network may include using, by the classification system on another device, the image as input to the neural network in response to receiving the data identifying the image.

The subject matter described in this specification can be implemented in particular embodiments and may result in one or more of the following advantages. In some implementations, a classification system may train large scale neural networks at a faster rate, e.g., in terms of number of steps, total time, or both, compared to other systems that do not use the methods described below, e.g., standard soft-max layers or hierarchical soft-max layers. In some implementations, a classification system's computation cost may depend only on K, the number of weight vectors used or the number of classes identified in an output layer, and may be independent of the total number of classes in an output layer of a neural network. In some implementations, a classification system may classify objects using on the order of hundreds of thousands to millions of classes with approximately the same computational cost of a classification system, e.g., a conventional deep neural network, with a few thousands of classes. In some implementations, a classification system may be used to train large scale neural networks, e.g., using additional data structures. For instance, the classification system may include an inverted hash table with timestamps for keeping track of, and updating, the hash table as the weight matrix is continuously updated during the training process.

In some implementations, a classification system with a neural network that has N classes in an output layer and that selects at most the top K weight vectors for the classes in the output layer may have an improved speed of N/K compared to other classification systems that do not use a hash table in the same manner. In some implementations, a classification system only performs comparisons when computing a hash code, e.g., which allows the classification system to determine the hash code using integer arithmetic. In some implementations, a classification system computes a hash code without accruing branch prediction penalties. In some implementations, the complexity of the classification system described below may depend on the dimensionality of an activation vector x, the number of M portions into which the activation vector x is divided, the number of nodes K for which the classification system performs matrix multiplication, or a combination of two or more of these. For example, since these values are independent of a number of classes in an output layer of a neural network, a classification system may accommodate any number of classes in the output layer, e.g., while providing a tradeoff between time complexity and accuracy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DESCRIPTION

This specification describes a method for neural networks, e.g., deep neural networks, that enables approximate computation of matrix products at various layers so that the number of output dimensions at a particular layer in the neural network can be increased by several orders of magnitude, while keeping the computation cost about the same and with little loss in accuracy. For instance, a neural network may use matrix multiplication W*x during a classification process, where x is the input from a layer and W refers to the weights of the connections to the next layer's outputs. The use of matrix multiplication may enable large-scale classification in the order of hundreds of thousands to millions of classes, e.g., during real-time computation to provide a user with a classification value based on input received from the user. In some examples, a deep neural network may use matrix multiplication for multi-class classification or binary classification.

In some implementations, a neural network uses a winner takes all (WTA) hash method to reduce the computation time for the matrix multiplication. For instance, a classification system stores a weight matrix W of a particular neural network layer y in a hash table using the WTA function. At run-time, the classification system computes hash codes using the activations from the previous layer x, e.g., the output values from the previous layer, and uses the hash codes to determine which nodes in the current layer y are most likely to be triggered based on the activations. For instance, the classification system uses the hash codes as input to the hash table to determine the nodes and then determines the corresponding weight vectors $W^{(K)}$ for those nodes.

The classification system retrieves the top K of those weight vectors, e.g., from the hash table or another location in memory, with K being much smaller than the number of nodes in the particular neural network layer y, e.g., much smaller than the number of classes N in an output layer of the neural network when the particular layer is the output layer, or than the size of the weight matrix W. Since hash table lookups can be performed in O(1), in some implementations the overall speed-up that can be obtained is proportional to N/K. For instance, the classification system's computation cost may depend only on K, the number of weight vectors used for the particular layer y or the number of classes identified in an output layer, and may be independent of the total number of classes in an output layer, e.g., N.

In one example, when a classification system classifies objects in an image or a video, the classification system may have a large number of classes, e.g., hundreds of thousands to millions, into which a given an object can be classified. For instance, the classification system may use a neural network to determine what a particular object is in an image, e.g., whether the object is a car, a truck, or a tree, with the neural network including one node in the output layer for each class into which the object can potentially be classified.

To reduce the number of computations performed, the classification system may take the activation vector from the second to last layer in the neural network and use the values from the activation vector as input to a hash table to determine for which nodes in the output layer the computation should be performed. For instance, the classification system determines K nodes, identified in the hash table, for which to perform the computation using the activation vector as input. The classification system then uses the output from those K nodes in the output layer to determine what the object in the image is, e.g., that the object is a car. For example, the classification system determines the output values for each of the K nodes and the greatest of those output values and classifies the object using the classification of the node with the greatest of the output values, e.g., without having to perform the computation for all of the nodes in the output layer.

In some examples, the classification system may perform K lookups in the hash table, or in multiple hash tables, and may determine that some of the lookups do not identify a node in the output layer. In these examples, the classification system performs the computation for less than K nodes in the output layer.

Figure 1:
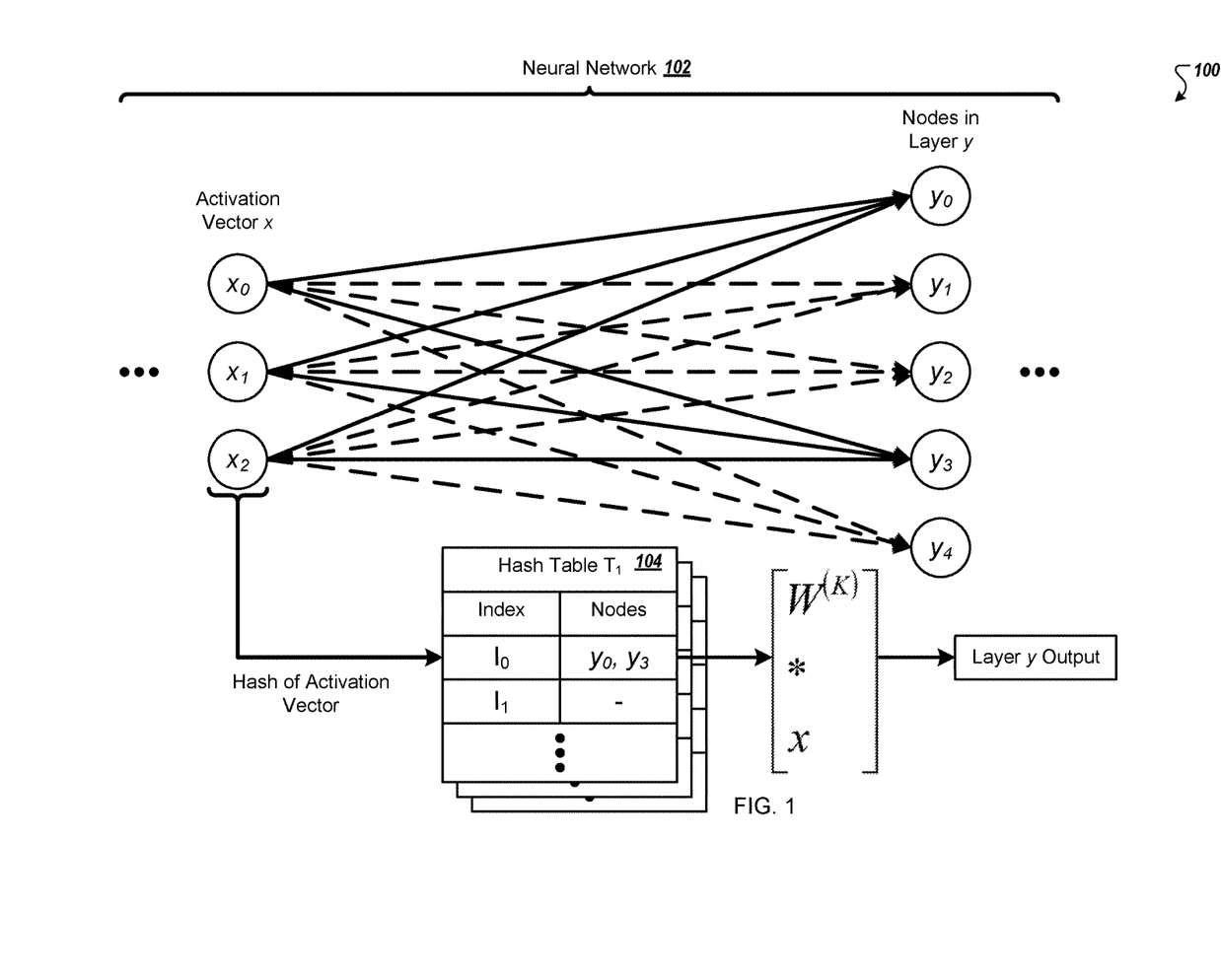
FIG. 1 is an example of a classification system that uses a hash table to determine for which nodes in a particular layer y to perform matrix multiplication using an activation vector x.

FIG. 1 is an example of a classification system 100 that uses a hash table to determine for which nodes in a particular layer y to perform matrix multiplication using an activation vector x. The classification system 100 is an example of a system implemented as computer programs on one or more computers in one or more locations, in which the systems, components, and techniques described below are implemented. For example, the particular layer y may be a soft-max or a logistic regression output layer in a neural network 102. The matrix multiplication may be a product of the activation vector x from a previous layer in the neural network or an initial input for the neural network, e.g., when the particular layer is an input layer in the neural network, and the weights W. The classification system 100 may use a hashing technique, e.g., a fast locality-sensitive hashing technique, to approximate the actual matrix multiplication to determine the output for the particular layer y.

The classification system 100 computes hash codes for the weight vectors of the weights W of the particular layer y and stores indices for the nodes in the particular layer y in a hash table 104 in indices that correspond to the hash codes. For instance, the classification system 100 trains the neural network 102 and determines the binary hash codes and the indices at which to store the indices for the nodes in the particular layer particular layer y during training, as described in more detail below.

The classification system 100 uses an input activation vector x to determine one or more hash codes. The classification system 100 uses the hash codes to determine a set of nodes $y_k$ in the particular layer y that are closest to the activation vector in the hash space and computes the matrix product for x and the set of nodes $y_k$ to determine the output for the particular layer y. The classification system 100 may set the output values for all other nodes in the particular layer y, other than the nodes in the set of nodes $y_k$, to zero.

The classification system 100 maintains the order of the set of nodes $y_k$ when generating output for the particular layer y. For instance, each time the classification system 100 generates an output vector using a particular neural network, the output value for a particular node in layer y is always in the same location of an output vector.

When the number of nodes in a particular layer y of the neural network 102 is large, the classification system 100 only needs output from the K nodes with the highest probabilities of activating based on the activation vector x. For instance, when the particular layer y is an output layer, the classification system 100 only needs output for the top K classes of the output layer and can determine the top K vectors $W^{(K)}$, from a weight matrix W, that have the largest dot products with the activation vector x. The classification system 100 computes the probabilities for only these K classes, and sets the probabilities of all other classes to zero.

During initialization of training, the classification system 100 uses, for a particular node in the particular layer y, the corresponding weight vector to compute the hash code for the particular node. The classification system 100 stores, in the hash table 104, identifiers for each of the nodes in the particular layer y using the corresponding hash codes as indices. The classification system 100 generates the hash codes from the weight vectors once to initialize the hash table 104 before performing training using training examples.

During training, the classification system 100 determines a hash code for an activation vector x by permuting the elements, e.g., numerical values, of the activation vector x. The classification system 100 may use P distinct permutations, described in more detail below, of the activation vector x to determine the hash code for the activation vector x. The classification system 100 determines the K nodes with the highest probabilities of activating and stores identifiers for those K nodes in the hash table 104 at the index specified by the determined hash code.

The classification system 100 receives an input example and provides the input example to the neural network 102. The neural network 102 uses the input example as input to a first layer and processes the input example through all layers leading up to the particular layer y. For the particular layer y, the neural network 102 computes a hash code using an activation vector x generated from the previous layer, or the input example when the particular layer y is the first layer. The neural network 102 queries the hash table using the hash code to determine the top K nodes in the particular layer y that have the highest probability of activating given the activation vector x. The neural network 102 determines the weight vectors $W^{(K)}$ for the top K nodes and computes the probabilities for the top K nodes using the activation vector x and the weight vectors $W^{(K)}$.

In some implementations, the classification system 100 trains the neural network 102 using downpour stochastic gradient descent (SGD). During back-propagation, the classification system 100 only propagates gradients based on the top K nodes that were retrieved during the forward pass of the neural network 102. The classification system 100 may update only the weight vectors for the top K nodes that were retrieved during the forward pass of the neural network 102 using an error vector for the output of the neural network 102.

In some examples, when the particular layer y is an output layer, the classification system 100 may propagate gradients for positive output nodes, e.g., in order to always provide a positive gradient. In these examples, the classification system 100 may update the weight vectors for the top K nodes that were retrieved during the forward pass and the positive output nodes, e.g., the output nodes that identify a correct classification of the input example. The classification system uses the updated weight vectors to compute updated hash codes for the top K nodes and moves the identifiers for the top K nodes, or a subset of these nodes, to the locations in the hash table 104 pointed to by the updated hash codes.

For instance, when the neural network 102 receives an image of a car as input, the neural network 102 may identify the top K nodes for the input image in the output layer y as nodes that represent a truck ($y_0$) or a tree ($y_3$). The neural network 102 may determine that the correct classification of the input is for node $y_2$ which identifies the image as a car. The classification system 100 updates the nodes in the output layer y of the neural network 102 that classify input as a car ($y_2$)—the correct classification, a truck ($y_0$)—an incorrect classification, a tree ($y_3$)—an incorrect classification, or two or more of these as part of the training process, by determining gradients for these nodes. The classification system 100 determines updated weight vectors for these nodes using the gradients. The classification system 100 uses the updated weight vectors to determine new hash codes for these nodes and places identifiers for these nodes in the hash table 104 at the location pointed to by the new hash codes.

In some implementations, the hash table 104 includes the weight vectors for the corresponding nodes. For instance, when creating the hash table 104, the classification system 100 stores an identifier for each of the nodes, the corresponding weight vector, or both in the hash table 104. During training the classification system 100 may use a hash code to retrieve the node identifiers and determine the corresponding weight vector, e.g., from a parameter server. The classification system 100 may use a hash code to retrieve the node identifiers and determine the corresponding weight vectors during run-time, e.g., using data stored with the classification system 100. In some examples, the classification system 100 may use the hash code to retrieve both the node identifiers and the corresponding weight vector from the hash table 104.

The neural network 102 uses the retrieved weight vectors to determine output for the particular layer y. For instance, when the particular layer y is an output layer of the neural network 102, the neural network 102 determines an output value for each of the nodes identified in the hash table 104. The neural network 102 may apply a function to the output values for each of the nodes identified in the hash table 104 to determine corresponding modified output values, e.g., the same function to each of the output values. The neural network 102 may determine a largest output value or a largest modified output value and uses the identifier for the largest output value or largest modified output value to classify the input. In some examples, when the particular layer y is not an output layer, e.g., and is a first layer or a hidden layer, the neural network 102 or the classification system 100 determine the output values for each of the nodes identified in the hash table 104, apply a function to the output values, and use the modified output values to create an output vector for the particular layer y.

In some implementations, the classification system 100 updates some of the weight vectors during each iteration of training but not all of the weight vectors, or some of the weights in a particular vector but not all of the weights in the particular vector. For instance, when the neural network 102 incorrectly determines that an image of a car has a highest probability of being either an image of a truck, e.g., node $y_0$, or an image of a tree, e.g., node $y_3$, based on a hash code identifying index $I_0$ of the hash table 104, the classification system 100 creates a new entry for the index $I_0$ that associates the index $I_0$ for the hash code with the node $y_2$ for a car classification and includes a time stamp with the entry, e.g., with a current time or a time at which the most recent training of the neural network 102 ended. Similarly, when a node's classification is correct, the classification system 100 may update an old time stamp for the entry in the hash table 104 with the current time.

In some examples, the classification system 100 may update or otherwise change values of the weight vector of a node in addition to updating the time stamp associating a node with a particular index in the hash table 104. For instance, during backward propagation, the classification system 100 may update values in the weight vector for the positive output node and update the corresponding time stamp to a current time stamp. In some examples, during backward propagation, the classification system 100 may update values in the weight vectors for incorrect output nodes and update the corresponding time stamp to a current time stamp.

The classification system 100 may periodically remove entries in the hash table 104 that do not have a current time stamp. For instance, the classification system may update the indices in the hash table 104 to which the nodes in the particular layer y are associated, the weights for each of the nodes, or both, over the course of server hundred or thousand training iterations. The classification system 100 may remove entries in the hash table 104 that do not have a current time stamp when all nodes in the particular layer y have been updated, e.g., either the index to which the node is associated or the corresponding weight vector, or both. In some examples, the classification system 100 may remove entries in the hash table 104 that do not have a current time stamp after a predetermined number of training iterations, e.g., one thousand, or using any other appropriate method.

During run-time, the classification system 100 receives an activation vector x and permutes the elements of the activation vector x using P distinct permutations to determine a hash code, e.g., the same P permutations used during training. The classification system 100 uses the hash code to determine the index of the top K nodes in the hash table 104.

For instance, the classification system 100 may convert each real number in the activation vector x to a binary value to create a binary vector. The classification system 100 converts the binary vector into an integer, e.g., by combining the binary values, and uses the integer as input to the hash table 104, e.g., as an index value for the hash table 104 to identify one or more nodes for which to compute matrix multiplication using the activation vector x.

In some implementations, during training and run-time, the classification system 100 divides the activation vector x that contains n elements into M portions that each contain n/M elements. The classification system 100, during training, creates a hash table 104 for each portion, $\{T_m:m=1 \ldots M\}$. For instance, the classification system 100 determines the hash code for each portion $x_m$ of the activation vector x, using the method described above or another appropriate method, and uses the resulting hash code as an index to the corresponding hash table $T_m$.

During run-time, the classification system 100 similarly determines the hash code for each portion $x_m$ of a corresponding activation vector x and uses the portions $x_m$ as indices to the corresponding hash tables $T_m$ to determine a set of all identifiers of the nodes for which to perform matrix multiplication. In some examples, each hash table $T_m$ has only one entry for each index and the classification system 100 determines the set of all identifiers of the nodes using the corresponding hash codes, e.g., to determine at most M nodes. In some examples, the hash table or hash tables 104 include only one entry for each of the nodes in the particular layer y.

In some implementations, the classification system 100 may retrieve a corresponding count for each node from the hash table 104. For instance, each count may provide a lower bound for the dot product between the activation vector x and the weight vector for the node. The count may represent the ordinal similarity between the two vectors. The classification system 100 may select the K nodes with the greatest ordinal similarity between the two vectors, e.g., when a greater ordinal similarity may represent a larger dot product between two vectors, and perform matrix multiplication for those nodes to determine the output for the particular layer y, e.g., to determine probabilities for each classification when the particular layer y is an output layer. For example, the K nodes with the greatest ordinal similarity may have weight vectors that are the nearest neighbors to the activation vector x based on dot product similarity.

In some examples, when the classification system 100 uses P distinct permutations, each index is represented using log(2K) bits resulting in P*log(2K) bits for the entire hash code. In some implementations, the classification system 100 uses a binary representation for the hash codes to reduce a memory footprint used by the classification system. In some implementations, the classification system 100 may use a WTA hash function that defines an ordinal embedding. For instance, as $P \rightarrow \infty$, the dot product between two WTA hashes tends to the rank correlation between the underlying vectors and WTA hashes are well suited as a basis for locality-sensitive hashing. This may result in a more robust proxy for dot product similarity and may be used to determine a count for each of the nodes that represents the ordinal similarity between the node and the activation vector x.

In some implementations, the classification system 100 may map some of the hash codes to empty entries in the hash table 104. For instance, the classification system 100 may divide the activation vector x into two portions and determine two hash codes that map to indices $I_0$ and $I_1$. The classification system 100 may determine that index $I_0$ includes two node identifiers, one for node $y_0$ and one for node $y_3$. The classification system 100 may determine that index $I_1$ does not include any node identifiers. In some examples, when the classification system 100 determines an index that does not map to any node identifiers, the classification system 100 may determine the top K nodes using M indices, when K is not equal to M, e.g., when K is less than M.

In some implementations, the neural network 102 may include multiple layers for which approximate computation of matrix products is performed. For instance, the classification system may use a hashing technique to approximate output for both one of the hidden layers of the neural network 102 and the output layer of the neural network 102.

Figure 2:
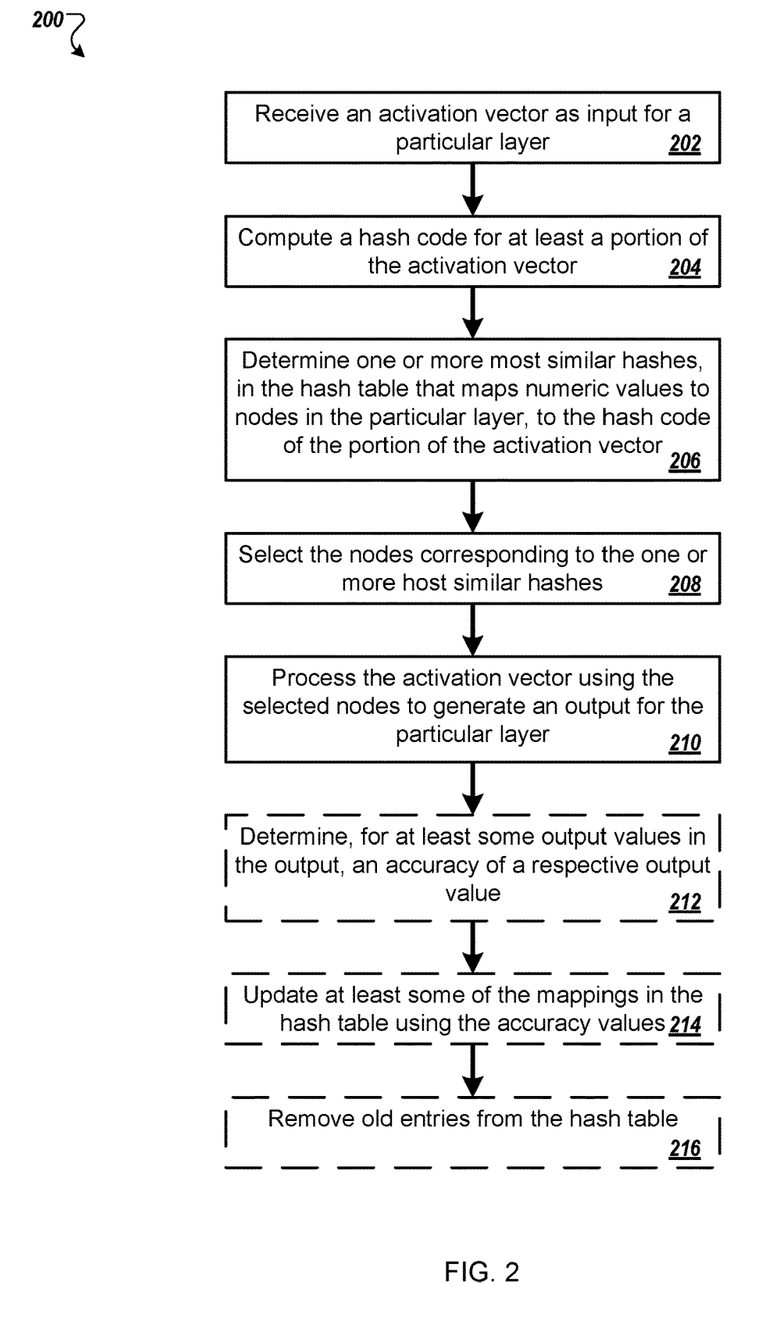
FIG. 2 is a flow diagram of a process for processing an activation vector using selected nodes in a layer to generate an output for the layer.

FIG. 2 is a flow diagram of a process 200 for processing an activation vector using selected nodes in a layer to generate an output for the layer. The process can be implemented by one or more computer programs installed on one or more computers. For example, the process 200 can be used by the classification system 100. Part of the process 200, e.g., steps 202 through 210, may be performed at run-time. Part of the process 200, e.g., steps 202 through 216, may be performed only during a training process.

At 202, the classification system receives an activation vector as input for a particular layer of a neural network.

At 204, the classification system computes a hash code for at least a portion of the activation vector. The classification system may divide the activation vector x into M portions and use any appropriate method to determine a hash code for each of the portions.

At 206, the classification system determines one or more most similar hashes, in the hash table that maps numeric values to nodes in the particular layer, to the hash code of the portion of the activation vector. For example, the classification system uses each hash code m to determine a corresponding entry in a respective hash table $T_m$ and one or more node identifiers for each entry. The classification system may retrieve a weight vector from the hash table $T_m$ with the respective node identifier or may use the node identifier to retrieve the weight vector from another system, e.g., a parameter server.

At 208, the classification system selects the nodes corresponding to the one or more host similar hashes. For instance, the classification system selects the top K nodes. In some examples, when each entry in the hash table(s) maps a single index value to a single node identifier, the classification system may determine the top K nodes when K is less than M, the number of hash codes used to access the hash table(s).

At 210, the classification system processes the activation vector using the selected nodes to generate an output for the particular layer. For example, the classification system performs matrix multiplication using the activation vector x and the determined weight vectors and then applies a function to the result of the matrix multiplication to generate an output for each selected node and sets all other output values for the particular layer y to zero.

As part of a training process, at 212, the classification system determines, for at least some output values in the output, an accuracy of a respective output value. For instance, the classification system determines the accuracy of the respective output values for backward propagation as part of a training process.

As part of a training process, at 214, the classification system updates at least some of the mappings in the hash table using the accuracy values. The classification system performs backward propagation to update some of the mappings, e.g., of node identifiers to hash codes, and weight vectors while leaving other mappings, weight vectors, or a combination of both, unchanged. For instance, the classification system may leave a majority of the mappings in a hash table unchanged for each iteration of training, e.g., for each training example.

As part of a training process, at 216, the classification system removes old entries from the hash table. For example, the classification system periodically removes old entries from the hash table during training to reduce the time necessary for training. For instance, if the classification system removed old entries during each iteration of training, the classification system would require more time for training.

The order of steps in the process 200 described above is illustrative only, and processing the activation vector using the selected nodes in the layer to generate the output for the layer can be performed in different orders. For example, the classification system may remove old entries from the hash table prior to receiving the activation vector, e.g., during a training process.

In some implementations, the process 300 can include additional steps, fewer steps, or some of the steps can be divided into multiple steps. For example, the classification system may perform steps 202 through 210 without performing steps 212 through 216, e.g., during run-time.

Figure 3:
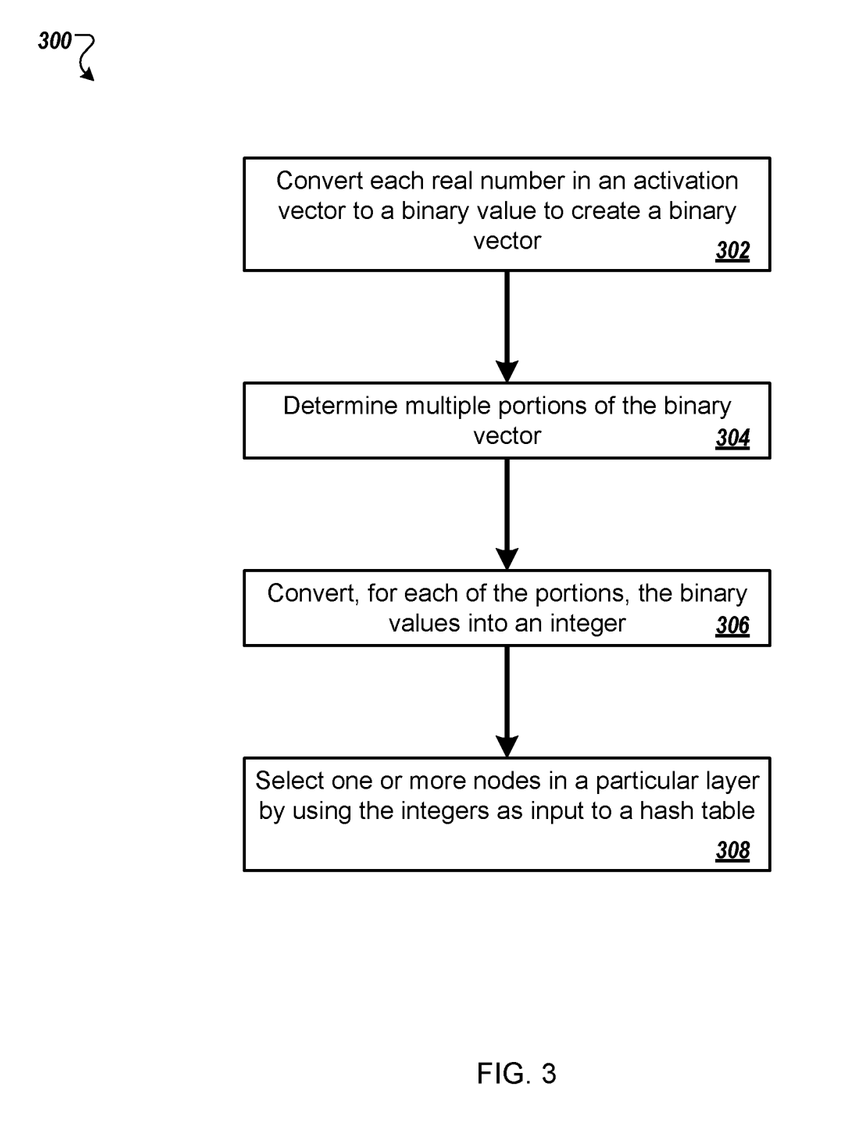
FIG. 3 is a flow diagram of a process for selecting nodes in a layer using integers as input to a hash table.

FIG. 3 is a flow diagram of a process 300 for selecting nodes in a layer using integers as input to a hash table. The process can be implemented by one or more computer programs installed on one or more computers. For example, the process 300 can be used by the classification system 100.

At 302, the classification system converts each real number in an activation vector to a binary value to create a binary vector. For instance, the classification system rounds each real number to one or zero.

At 304, the classification system determines multiple portions of the binary vector. For example, the classification system determines the number of binary values that should be included in each of M portions of the binary vector so that each portion has the same, or approximately the same, number of binary values. In some examples, some of the portions may have one more or one fewer binary value than some of the other portions. The classification system uses the same number of portions M and the same number of binary values in each of the respective portions during training and run-time.

At 306, the classification system converts, for each of the portions, the binary values into an integer. For instance, the classification system uses any appropriate method to use all of the binary values in a particular portion to an integer. The classification system may use the sum of the binary values in the particular portion to determine the corresponding integer value.

At 308, the classification system selects one or more nodes in a particular layer by using the integers as input to a hash table. For example, the classification system uses each of the integers as a hash code as an index in a corresponding hash table. The classification system may determine zero, one, or more node identifiers for each of the hash codes used as an index in a corresponding hash table.

The order of steps in the process 300 described above is illustrative only, and selecting nodes in the layer using integers as input to the hash table can be performed in different orders. For example, the classification system may determine multiple portions M of the activation vector and then convert each reach number in each of the portions, or a subset of the portions, to a binary value to create multiple binary vectors, or a single binary vector with multiple portions.

In some implementations, the process 300 can include additional steps, fewer steps, or some of the steps can be divided into multiple steps. For example, the classification system may perform steps 302, 306, and 308 without performing step 304.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for processing an input through each of a plurality of layers of a neural network to generate an output, wherein each of the plurality of layers of the neural network comprises a respective plurality of nodes, the method comprising, for a particular layer of the plurality of layers:
   determining, by a classification system, one or more hash codes of an activation vector that is input for the particular layer;
   selecting one or more nodes in the particular layer using the one or more hash codes of the activation vector as input to a lookup function for a hash table that maps hash codes of activation vectors to data for weight values for nodes in the particular layer, the selecting comprising:
      determining, for at least some of the one or more hash codes, an entry in the hash table at an index having a value that is the same as the hash code; and
      determining, for each of the entries in the hash table, one or more weight value vectors that are identified by the entry in the hash table at the index having a value that is the same as the hash code, wherein each of the one or more weight value vectors is for a corresponding one of the selected nodes; and
   generating an output for the particular layer by combining the weight values for the selected nodes with the activation vector, the generating comprising:
      combining, for each of the selected nodes, the corresponding weight value vector with the activation vector.

2. The method of claim 1, wherein determining, for each of the entries in the hash table, the one or more weight value vectors that are identified by the entry in the hash table at the index having a value that is the same as the hash code comprises:
   determining, for each of the entries in the hash table, one or more node identifiers that are included in the entry in the hash table at the index having a value that is the same as the hash code, wherein each of the node identifiers in the one or more node identifiers corresponds to one of the selected nodes, wherein the data for the weight values for nodes in the particular layer comprises the one or more node identifiers; and
   determining, for each of the selected nodes using the corresponding node identifier, the one or more weight value vectors for the selected node.

3. The method of claim 2, wherein determining, for each of the selected nodes using the corresponding node identifier, the one or more weight value vectors for the selected node comprises requesting, from a parameter database, the one or more weight value vectors for the selected node.

4. The method of claim 1, wherein determining the one or more weight value vectors that are identified in the entry in the hash table at the index having a value that is the same as the hash code comprises determining, for at least some of the entries in the hash table, the one or more weight value vectors that are included in the entry in the hash table at the index having a value that is the same as the hash code, wherein the data for the weight values for nodes in the particular layer comprise the one or more weight value vectors.

5. The method of claim 1, wherein combining the weight values for the selected nodes with the activation vector comprises multiplying the activation vector with the weight values.

6. The method of claim 1, wherein:
the activation vector comprises a vector of real number values;
determining the one or more hash codes of the activation vector that is input for the particular layer comprises:
converting each of the real number values in the activation vector to binary values to create a binary vector;
determining a plurality of portions of the binary vector; and
converting, for each of the portions of the binary vector, the binary values in the respective portion into an integer; and
selecting the one or more nodes in the particular layer using the one or more hash codes of the activation vector as input to the lookup function for the hash table that maps hash codes to data for weight values for nodes in the particular layer comprises selecting, using the integers as input to the lookup function for the hash table, the weight values for nodes in the particular layer.

7. A system comprising one or more computers and one or more storage devices storing instructions that are operable, when executed by the one or more computers, to cause the one or more computers to perform operations comprising:
determining one or more hash codes of an activation vector that is input for a particular layer of a neural network;
selecting one or more nodes in the particular layer using the one or more hash codes of the activation vector as input to a lookup function for a hash table that maps hash codes of activation vectors to data for weight values for nodes in the particular layer, the selecting comprising:
determining, for at least some of the one or more hash codes, an entry in the hash table at an index having a value that is the same as the hash code; and
determining, for each of the entries in the hash table, one or more weight value vectors that are identified by the entry in the hash table at the index having a value that is the same as the hash code, wherein each of the one or more weight value vectors is for a corresponding one of the selected nodes; and
generating an output for the particular layer by combining the weight values for the selected nodes with the activation vector, the generating comprising:
combining, for each of the selected nodes, the corresponding weight value vector with the activation vector.

8. The system of claim 7, wherein determining, for each of the entries in the hash table, the one or more weight value vectors that are identified by the entry in the hash table at the index having a value that is the same as the hash code comprises:
determining, for each of the entries in the hash table, one or more node identifiers that are included in the entry in the hash table at the index having a value that is the same as the hash code, wherein each of the node identifiers in the one or more node identifiers corresponds to one of the selected nodes, wherein the data for the weight values for nodes in the particular layer comprises the one or more node identifiers; and
determining, for each of the selected nodes using the corresponding node identifier, the one or more weight value vectors for the selected node.

9. The system of claim 8, wherein determining, for each of the selected nodes using the corresponding node identifier, the one or more weight value vectors for the selected node comprises requesting, from a parameter database, the one or more weight value vectors for the selected node.

10. The system of claim 7, wherein determining the one or more weight value vectors that are identified in the entry in the hash table at the index having a value that is the same as the hash code comprises determining, for at least some of the entries in the hash table, the one or more weight value vectors that are included in the entry in the hash table at the index having a value that is the same as the hash code, wherein the data for the weight values for nodes in the particular layer comprise the one or more weight value vectors.

11. The system of claim 7, wherein combining the weight values for the selected nodes with the activation vector comprises multiplying the activation vector with the weight values.

12. The system of claim 7, wherein:
the activation vector comprises a vector of real number values;
determining the one or more hash codes of the activation vector that is input for the particular layer comprises:
converting each of the real number values in the activation vector to binary values to create a binary vector;
determining a plurality of portions of the binary vector; and
converting, for each of the portions of the binary vector, the binary values in the respective portion into an integer; and
selecting the one or more nodes in the particular layer using the one or more hash codes of the activation vector as input to the lookup function for the hash table that maps hash codes to data for weight values for nodes in the particular layer comprises selecting, using the integers as input to the lookup function for the hash table, the weight values for nodes in the particular layer.

13. A computer storage medium encoded with instructions that, when executed by one or more computers, cause the one or more computers to perform operations comprising:
determining one or more hash codes of an activation vector that is input for a particular layer of a neural network;
selecting one or more nodes in the particular layer using the one or more hash codes of the activation vector as input to a lookup function for a hash table that maps hash codes of activation vectors to data for weight values for nodes in the particular layer, the selecting comprising:
- determining, for at least some of the one or more hash codes, an entry in the hash table at an index having a value that is the same as the hash code; and
- determining, for each of the entries in the hash table, one or more weight value vectors that are identified by the entry in the hash table at the index having a value that is the same as the hash code, wherein each of the one or more weight value vectors is for a corresponding one of the selected nodes; and
- generating an output for the particular layer by combining the weight values for the selected nodes with the activation vector, the generating comprising:
  - combining, for each of the selected nodes, the corresponding weight value vector with the activation vector.

14. The computer storage medium of claim 13, wherein determining, for each of the entries in the hash table, the one or more weight value vectors that are identified by the entry in the hash table at the index having a value that is the same as the hash code comprises:
- determining, for at least some of the one or more hash codes, an entry in the hash table at an index having a value that is the same as the hash code;
- determining, for each of the entries in the hash table, one or more node identifiers that are included in the entry in the hash table at the index having a value that is the same as the hash code, wherein each of the node identifiers in the one or more node identifiers corresponds to one of the selected nodes, wherein the data for the weight values for nodes in the particular layer comprises the one or more node identifiers; and
- determining, for each of the selected nodes using the corresponding node identifier, the one or more weight value vectors for the selected node.

15. The computer storage medium of claim 14, wherein determining, for each of the selected nodes using the corresponding node identifier, the one or more weight value vectors for the selected node comprises requesting, from a parameter database, the one or more weight value vectors for the selected node.

16. The computer storage medium of claim 13, wherein determining, the one or more weight value vectors that are identified in the entry in the hash table at the index having a value that is the same as the hash code comprises determining, for at least some of the entries in the hash table, the one or more weight value vectors that are included in the entry in the hash table at the index having a value that is the same as the hash code, wherein the data for the weight values for nodes in the particular layer comprise the one or more weight value vectors.

17. The computer storage medium of claim 13, wherein combining the weight values for the selected nodes with the activation vector comprises multiplying the activation vector with the weight values.

18. The computer storage medium of claim 13, wherein:
- the activation vector comprises a vector of real number values;
- determining the one or more hash codes of the activation vector that is input for the particular layer comprises:
  - converting each of the real number values in the activation vector to binary values to create a binary vector;
  - determining a plurality of portions of the binary vector; and
  - converting, for each of the portions of the binary vector, the binary values in the respective portion into an integer; and
- selecting the one or more nodes in the particular layer using the one or more hash codes of the activation vector as input to the lookup function for the hash table that maps hash codes to data for weight values for nodes in the particular layer comprises selecting, using the integers as input to the lookup function for the hash table, the weight values for nodes in the particular layer.

* * * * *